(12) United States Patent
Weeks

(10) Patent No.: US 7,188,417 B2
(45) Date of Patent: Mar. 13, 2007

(54) ADVANCED L-CHANNEL WELDED NOZZLE DESIGN

(75) Inventor: Jack L Weeks, Scottsboro, AL (US)

(73) Assignee: United Technologies Corporation, Hartford, CT (US)

(*) Notice: Subject to any disclaimer, the term of this patent is extended or adjusted under 35 U.S.C. 154(b) by 379 days.

(21) Appl. No.: 10/751,850

(22) Filed: Jan. 6, 2004

(65) Prior Publication Data

US 2005/0166398 A1    Aug. 4, 2005

Related U.S. Application Data

(62) Division of application No. 10/186,131, filed on Jun. 28, 2002, now abandoned.

(51) Int. Cl.
*B21D 53/00* (2006.01)
*B64D 33/04* (2006.01)
*F02K 1/00* (2006.01)

(52) U.S. Cl. .................. 29/890.01; 60/770; 239/127.1
(58) Field of Classification Search ............. 29/890.01, 29/890.142, 890.143; 60/266, 267, 770; 239/127.1
See application file for complete search history.

(56) References Cited

U.S. PATENT DOCUMENTS

| | | | | | |
|---|---|---|---|---|---|
| 3,082,601 | A | * | 3/1963 | Horst ........................... | 60/267 |
| 3,177,935 | A | * | 4/1965 | Rosman ....................... | 165/169 |
| 3,182,448 | A | * | 5/1965 | Rabe ........................... | 60/267 |
| 3,190,070 | A | * | 6/1965 | Neu, Jr. ....................... | 60/267 |
| 3,254,487 | A | * | 6/1966 | Baehr ........................... | 60/770 |
| 3,334,485 | A | * | 8/1967 | Rhodes et al .................. | 60/208 |

(Continued)

FOREIGN PATENT DOCUMENTS

GB           838550       *   6/1960

(Continued)

OTHER PUBLICATIONS

A. Bowman & J. Haggander, "Laser Welded Channel Wall Nozzle Design, Manufacturing and Hot Gas Testing" American Institute of Aeronautics & Astronautics, 1999, Abstract.*

(Continued)

*Primary Examiner*—Eric Compton
(74) *Attorney, Agent, or Firm*—Harness Dickey & Pierce P.L.C.

(57) ABSTRACT

A fluid flow nozzle is formed by a plurality of adjacent L-shaped channels forming successive channel pairs. Each channel has a linking member joined to a radial member. Each linking member is welded to an adjacent linking member forming a contiguous surface of linking members. Each radial member is oriented approximately perpendicular to a first side of the contiguous surface. A circumferentially enclosed chamber is formed on a second side of the contiguous surface. Each radial member is laser welded to a jacket at a distal end of each radial member. The jacket is oriented approximately parallel with the contiguous surface and separably spaced from the contiguous surface by the radial members. Each radial member forms one of a plurality of flow chambers between its adjacent radial member, the jacket and the contiguous surface. The flow chambers advantageously contain fluid in the event of a radial member rupture.

30 Claims, 7 Drawing Sheets

U.S. PATENT DOCUMENTS

| | | | |
|---|---|---|---|
| 3,501,916 A * | 3/1970 | Dederra et al. ............... 60/267 |
| 3,595,025 A | 7/1971 | Stockel et al. |
| 3,692,637 A * | 9/1972 | Dederra et al .............. 205/114 |
| 3,729,793 A | 5/1973 | Schmidt et al. |
| 4,592,414 A | 6/1986 | Beasley |
| 4,707,225 A | 11/1987 | Schuler et al. |
| 4,890,454 A | 1/1990 | Schmidt et al. |
| 4,909,032 A * | 3/1990 | Horiuchi et al. ............. 60/260 |
| 4,942,653 A | 7/1990 | Hawkinson |
| 5,221,045 A | 6/1993 | McAninch et al. |
| 5,226,598 A | 7/1993 | Woehrl |
| 6,279,812 C1 | 8/2001 | Hallqvist |
| 6,289,584 C1 | 9/2001 | Hedman |
| 6,591,499 B1 * | 7/2003 | Lundgren .................. 29/890.1 |
| 6,920,750 B2 * | 7/2005 | Haggander et al. ........... 60/267 |
| 2005/0188678 A1 * | 9/2005 | Haggander .................. 60/266 |

FOREIGN PATENT DOCUMENTS

| | | | |
|---|---|---|---|
| GB | 843923 | * | 8/1960 |
| JP | 07-279761 | * | 10/1995 |

OTHER PUBLICATIONS

M. Hallberg & T. Stenholm, "Laser Welded sandwich manufacturing technology for nozzle extensions." AIAA/ASME/SAE/ASEE Joint Propulsion Conference and Exhibit, 37th, Jul. 8-11, 2001, Abstract.*

L. Winterfeldt & E. Stenstroem, "Functional aspects on laser welded sandwich walls for rocket engine nozzles." AIAA/ASME/SAE/ASEE Joint Propulsion Conference and Exibit, 37th, Jul. 8-11, 2001, Abstract.*

J. Haggander et al. "Current statuts of laser welded sandwich nozle extensions." AIAA/ASME/SAE/ASEE Joint Propulsion Conference and Exhibit, 38th, Jul. 7-10, 2002, Abstract.*

Article, Boeing: Rocketdyne; Rocket Based Combined Cycle (RBCC) Engine.

* cited by examiner

ADVANCED L-CHANNEL WELDED NOZZLE DESIGN

CROSS-REFERENCE TO RELATED APPLICATIONS

"This application is a divisional of U.S. patent application Ser. No. 10/186,131 filed on Jun. 28, 2002, abandoned. The disclosure of the above application is incorporated herein by reference."

FIELD OF THE INVENTION

The present invention relates generally to flow nozzles, and more specifically to flow nozzles having an inner and an outer wall separated by interstitial flow spacing.

BACKGROUND OF THE INVENTION

Rocket engine nozzles are currently configured in two general shapes, conical and ramp configuration, both in various sizes and materials to suit the high temperature and pressure environment for which they are designed. A common design for conical shaped rocket nozzles provides a single pass, multiple brazed-tube nozzle wall. A plurality of tubes are joined side-to-side to form an outer wall of a nozzle wherein the tubes also act as flow channels for the combustion fuel. Combustion fuel enters each of the tubes from a manifold, is preheated as it traverses the tubes, and simultaneously acts to cool the nozzle. This conventional design includes a plurality of circular tubes numbering approximately 1,000 to approximately 1,100 tubes. The individual tubes are drawn and swaged such that a diameter of each tube decreases and its wall thickness increases from a nozzle discharge end to a nozzle inlet end. This conventional tube design includes materials that are difficult to weld, particularly in a tube-wall to tube-wall configuration. A brazing process is therefore used to join the tubes. Each of the drawn and swaged tubes is first coated with a nickel material which is suitable to braze the plurality of tubes in a side-to-side configuration. The swaged and coated tubes are arranged having the larger diameter ends adjacent to one another to form the nozzle conical shape and the arrangement is collectively furnace brazed.

One drawback of brazed rocket nozzles is that repair of reusable nozzles is difficult and expensive. The heat of combustion as well as the number of cycles of heating and cooling that a reusable nozzle is subjected to cause the materials to fatigue and crack. Because the tube materials are difficult to weld, nozzle repair is generally limited to brazing techniques on each tube. Brazing of individual tubes is time consuming and often incapable of repairing large cracks. If a tube cannot be braze-repaired, the tube is sealed. When a specified percentage of tubes are sealed, the nozzle can no longer be used.

A common rocket nozzle has a diameter of approximately 76.2 cm (30 in) adjacent to the main combustion chamber of the rocket engine. The large diameter or distal end of the nozzle has approximately a 183 cm (6 ft) diameter. A further drawback of the brazed nozzle design is that attempts to repair a nozzle of this size itself creates problems in that heat input during the repair process can create sequential problems with the brazed material in adjacent or local tubes.

A further drawback of the common brazed nozzle design is that the brazed joint is the weakest link. Even a small rupture in a brazed tube-to-tube joint can result in either reduced cooling at the upper nozzle (i.e., adjacent to the combustion chamber) or a leak of preheated fuel into the nozzle flame, either of which can result in catastrophic nozzle failure.

A need therefore exists for a nozzle design providing a repairable configuration which does not rely on the brazing process. A need also exists to replace the tube-to-tube design commonly used with a configuration which is easier to form and which permits either repair of individual flow channels or replacement of segments of flow channels.

SUMMARY OF THE INVENTION

According to a preferred embodiment of the present invention, a fluid flow nozzle is provided comprising a plurality of adjacent L-shaped channels. Each L-shaped channel includes a channel linking member and a channel radial member, said channel radial member being arranged approximately perpendicular to said channel linking member. Each channel linking member is joined to an adjacent L-shaped channel linking member forming a contiguous surface of linking members. A distal end of each channel linking member is weldably joined to its adjacent L-shaped channel at an intersection between its channel linking member and its channel radial member. The plurality of channel linking members thus joined form the contiguous surface having an inner face and an outer face. The plurality of L-shaped channels thus joined are then formed in a desired geometric shape having each of the channel radial members extending outwardly from a central axis point defining the geometric shape. Each channel radial member extends radially outward from the outer face of the contiguous surface.

A jacket is circumferentially disposed about the contiguous wall in contact with a distal end of each of the channel radial members. A predetermined position of each channel radial member is mapped through the jacket wall. A weld joint is formed through the jacket wall along each intersection between a jacket inner wall to the distal end of each channel radial member. The weld joints are preferably laser welds made by a laser welding torch programmed to follow the predetermined position of each channel radial member.

The plurality of channel linking members forms both a nozzle inside boundary and an inside surface for a plurality of flow channels each formed by adjacent pairs of the channel radial members. The jacket weldably joined to each of the channel radial members forms an outside surface of each of the plurality of flow channels. In a preferred embodiment, each channel radial member has a reduced wall thickness compared to both the channel linking members and the jacket. By reducing the wall thickness of each channel radial member, a pressure from a fluid flowing within the flow channels, upon reaching a critical pressure, will collapse one or more channel radial members before rupturing the pressure boundary formed by either the channel linking members or the jacket. This design choice results in containment of the fluid within the flow channels reducing the chance of combustible fluid escape to either the nozzle inside chamber or to the atmosphere outside of the jacket.

In still another preferred embodiment of the present invention, the plurality of channel linking members form an outer surface of a nozzle and the jacket forms an inner surface of the nozzle. The plurality of channel linking members form a contiguous surface having an inner face and an outer face. The plurality of L-shaped channels thus joined are then formed in a desired geometric shape having each of the channel radial members extending inwardly from the contiguous surface inner face toward a central axis point defining the geometric shape.

In a preferred embodiment of the present invention, each L-shaped channel is drawn and swaged such that a distal end of each channel linking member has a reduced wall thickness and an increased width relative to its proximate end. Each drawn and swaged L-shaped channel is placed in a preformed tool to control spacing between L-shaped channels and provide a desired geometric shape. The geometric shape of the preformed tool comprises preferably one of a circle, an oval, a cone, a cylinder, an ellipsoid, a paraboloid, and a hyperboloid. Each of the channel linking members are joined at their narrower proximate ends to form a first end of a nozzle assembly. Each of the channel linking members are similarly joined at their wider distal ends to form a second end of a nozzle assembly. A geometric shape approximating a cone is formed thereby.

In another preferred embodiment, the nozzle assembly is preferably constructed in quarter or similar sub-unit sections. Each quarter section has an edge seam weldable to an adjacent quarter section edge seam. Assembly using quarter sections potentially improves the nozzle manufacturing time by permitting a non-repairable defect in one section of the nozzle to be removed and replaced quickly and easily. Later maintenance of the nozzle is also improved by allowing sections which have non-repairable cracks or leaks formed therein to be replaced in quarter sections, along edge seams. A non-repairable crack or rupture in any quarter section of the nozzle assembly will therefore not result in plugged flow channels or non-reusable nozzles. Quarter sections of different nozzle designs can be preassembled for either initial construction use or later maintenance replacement.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention. The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
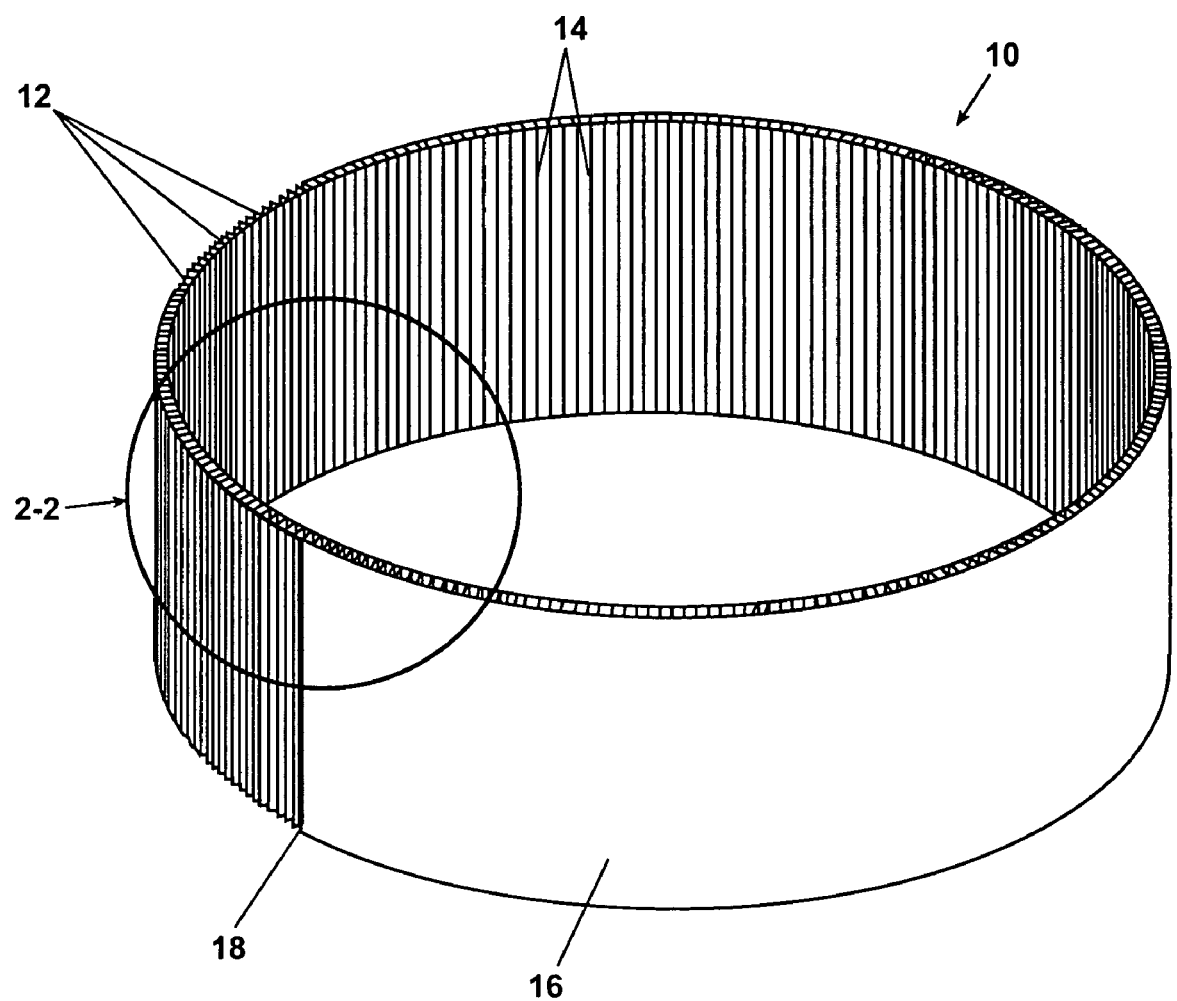
FIG. 1 is a perspective view of a circular assembly of L-shaped channels encompassed by a jacket in accordance with a preferred embodiment of the present invention.

Referring to FIG. 1, a cylindrical nozzle assembly 10 of a preferred embodiment of the present invention is shown. The nozzle assembly 10 comprises a plurality of L-shaped channels 12 each joined by a longitudinal weld joint 14. A jacket 16 encloses the plurality of L-shaped channels having butted ends welded at an exemplary jacket edge seam 18.

Figure 2:
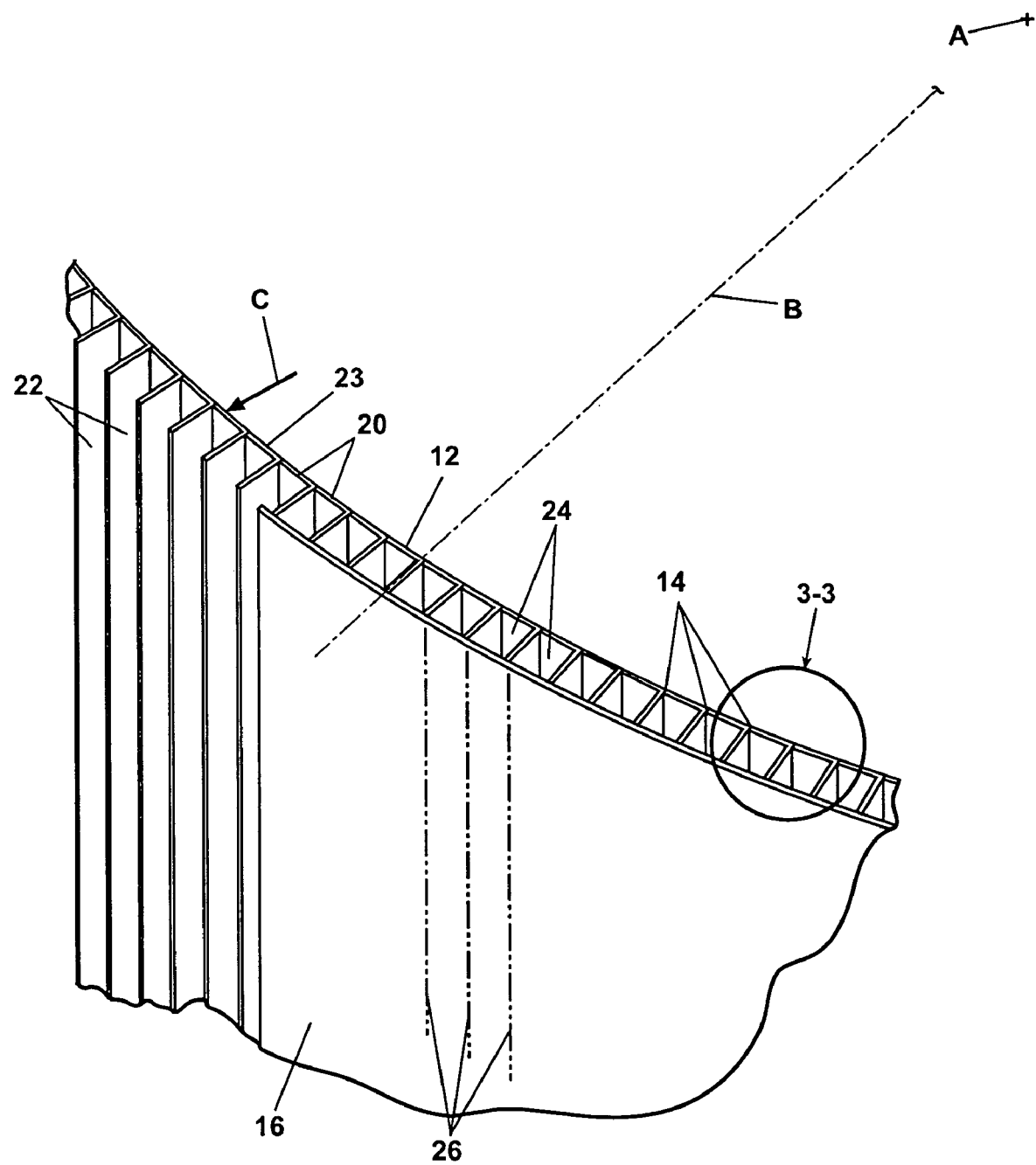
FIG. 2 is an exploded perspective view of Area 2 of FIG. 1, showing the assembly of individual L-shaped channels and the jacket.

Referring to FIG. 2, an exploded view of the partial area 2 of FIG. 1 is shown. Each of the plurality of L-shaped channels 12 comprises a channel linking member 20 and a channel radial member 22. The channel radial member 22 is arranged approximately perpendicular to the channel linking member 20. Each of the L-shaped channels 12 are arranged such that each channel linking member 20 lies approximately perpendicular to a center of curvature A. A nozzle inner wall 23 is thereby formed about the center of curvature A along an assembly radius C. Each channel radial member 22 is centrally aligned approximately parallel with each of a plurality of radial lines B.

A distal end of each channel linking member 20 forms a corner joint with an adjacent L-shaped channel at an outside facing corner between the channel linking member 20 and the channel radial member 22. A longitudinal weld joint 14 is formed at each corner joint which will be described in further detail in FIG. 3. The jacket 16 is disposed about the outer perimeter of the nozzle assembly 10 and is welded to a distal end of each channel radial member 22 at a plurality of exterior laser weld joints 26.

The nozzle inner wall 23 formed by the plurality of channel linking members 20 and the jacket 16 encloses a plurality of flow channels 24. Each channel radial member 22 forms a boundary between adjacent flow channels 24. Each flow channel 24 is sealed and separated from its adjacent flow channel by the plurality of longitudinal weld joints 14 and the plurality of exterior laser weld joints 26. Each flow channel 24 permits a fluid flow in either direction as shown in FIG. 2 for a combustible fluid such as a rocket fuel.

Figure 3:
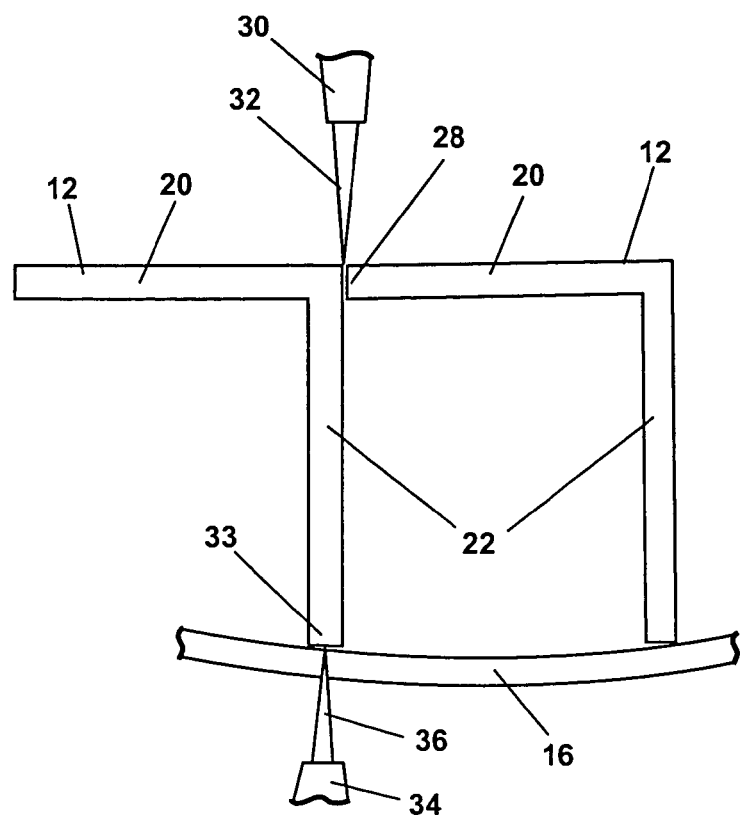
FIG. 3 is an exploded top view of Area 3 of FIG. 2 showing the corner weld joint assembly of a preferred embodiment of the present invention.

Referring now to FIG. 3, an exemplary pair of L-shaped channels 12 are shown. A distal end of one channel linking member 20 identified as a butted end 28 is aligned with the adjacent L-shaped channel 12 prior to welding. A laser torch 30 having a laser beam 32 is used to form each of the longitudinal weld joints 14 (shown in FIG. 2) at the junction between the butted end 28 and the adjacent L-shaped channel 12. In a preferred embodiment, no filler weld material is added to the longitudinal weld joints 14.

Each pair of L-shaped channels 12 is held in the general configuration shown in FIG. 3 prior to welding by one or more assembly tools (not shown) which are known in the art and will therefore not be further discussed herein. The assembly tool maintains fit-up between each pair of the L-shaped channels 12. A radial member distal end 33 is also positioned by the assembly tool adjacent to the jacket 16 to maintain fit-up to weldably join the jacket 16 to each radial member distal end 33 using one of the plurality of exterior laser weld joints 26 shown in FIG. 2. A laser torch 34 and its associated laser beam 36 are used to cut through the thickness of the jacket 16 to each radial member distal end 33 to join the jacket 16 to each radial member distal end 33. Similar to the longitudinal weld joints 14, no filler material is used to make the exterior laser weld joints 26 in the preferred embodiment shown.

The longitudinal weld joints 14 formed at each butted end 28 of the channel linking members 20 are easily accessible for welding. The exterior laser weld joint 26 formed at the radial member distal end 33 to the jacket 16 requires indication of the location of each radial member distal end 33 prior to making the weld joint. The location of each radial member distal end 33 can be found in several ways. In one technique known in the art, an x-ray machine (not shown) is used to identify the location of each radial member distal end 33 through the thickness of the jacket 16 to ensure proper alignment for the exterior laser weld joint 26. Similarly, an ultrasonic sensor (not shown), also known in the art, can also be used to identify the location of each radial member distal end 33 prior to making the exterior laser weld joint 26 through the jacket 16. Fit-up between each radial member distal end 33 and the jacket 16 for making the exterior laser weld joint 26 is obtained through tooling (discussed above) which is known in the art. The tooling forces each channel radial member 22 into approximate contact with the jacket 16 to retain the minimal required clearances for welding fit-up.

Figure 4:
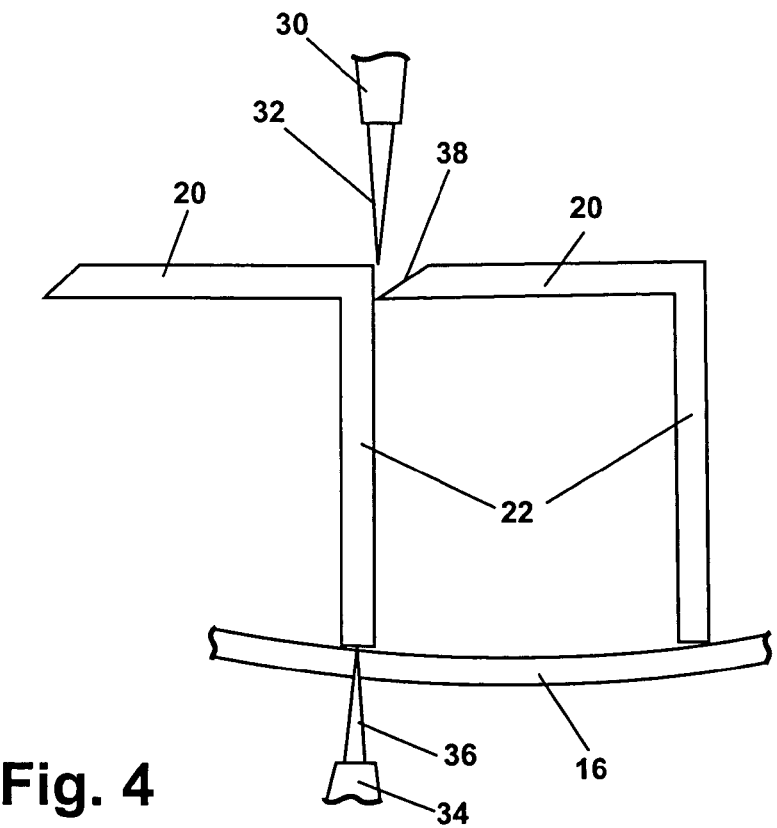
FIG. 4 is an exploded top view similar to FIG. 3, showing an alternate embodiment of the present invention having beveled edges at distal ends of each of the channel linking members.

Referring now to FIG. 4, an alternate embodiment of the present invention is shown. A beveled end 38 for each channel linking member 20 is formed. The beveled end 38 is known in the art, and is used if a filler material (not shown) is desired in forming the longitudinal weld joint 14 between each channel linking member 20 and its adjacent channel linking member 20. A beveled end of the channel radial member 22 is undesirable because it would reduce the contact surface for the exterior laser weld joint 26, and the use of a filler material adds unnecessary time and expense to the process of making these welds. Other joint designs known in the art can also be substituted.

Figure 6:
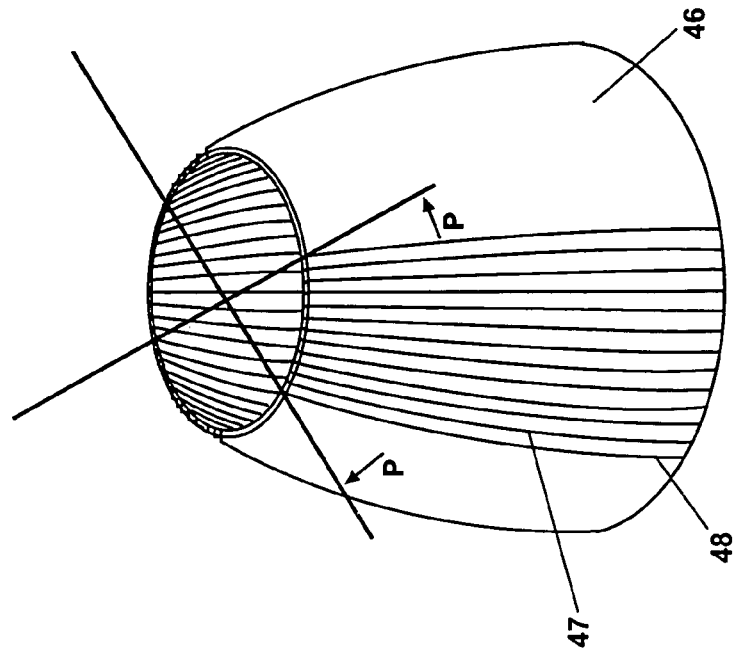
FIG. 6 is the perspective view of FIG. 5 further including a jacket disposed approximately three quarters of the perimeter of the cone shaped nozzle of FIG. 5 to illustrate an edge seam of the present invention.
Figure 5:
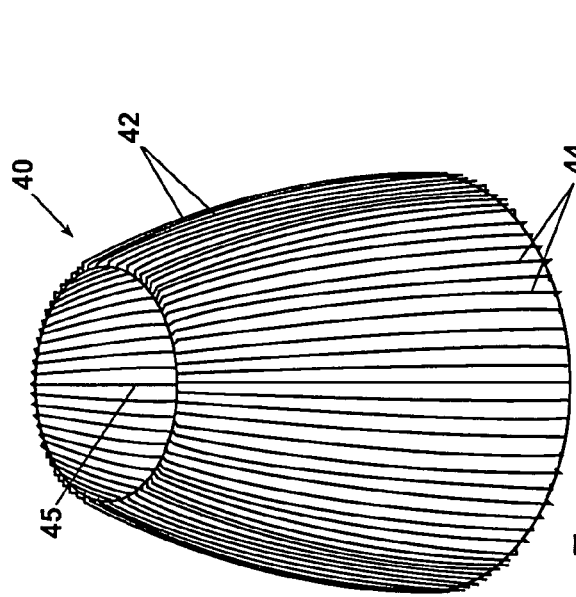
FIG. 5 is a perspective view of a subassembly of channel linking members arranged into a cone shape prior to longitudinal laser welding of the channel linking members.
Figure 7:
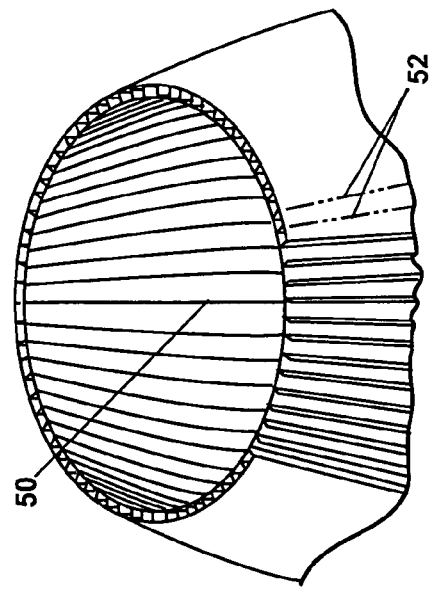
FIG. 7 is a partial exploded view taken from FIG. 6 showing the external laser welds joining the jacket to each of the channel radial members and the longitudinal laser welds joining each of the channel linking members.

Referring to FIGS. 5, 6 and 7, the assembly stages of a conical nozzle 40 are shown. The conical nozzle 40 is formed using a plurality of swaged L-channels 42 each having a radial member 44. A swaged L-channel 42 is further detailed in FIG. 11. The plurality of swaged L-channels 42 are arranged in a tool (not shown) to hold each of the swaged L-channels 42 prior to welding in a configuration of the conical nozzle 40. An expansion tool (not shown) known in the art can also be used to force each of the swaged L-channels 42 into substantial contact with the tool. Each longitudinal weld 50 is made at this time to form the inside wall of the conical nozzle 40. A conical jacket 46 is then disposed about each of the radial members 44 as shown in FIG. 6. The closure for the conical jacket 46 is formed by at least one conical jacket edge seam 48. In a preferred embodiment of the present invention, the conical nozzle 40 is formed in quarter sections, as indicated by arrows P in FIG. 6, such that a quantity of 4 conical jacket edge seams 48 are used to join the assembly. By forming the conical nozzle 40 in quarter sections, stack-up tolerances as each of the swaged L-channels 42 are joined can be controlled and if a problem during manufacture of the conical nozzle 40 is encountered, a quarter section of the assembly can be removed and replaced. FIG. 7 also shows the exterior laser weld joints 52 which are formed similar to the exterior laser weld joints 26 of FIG. 2.

Figure 8:
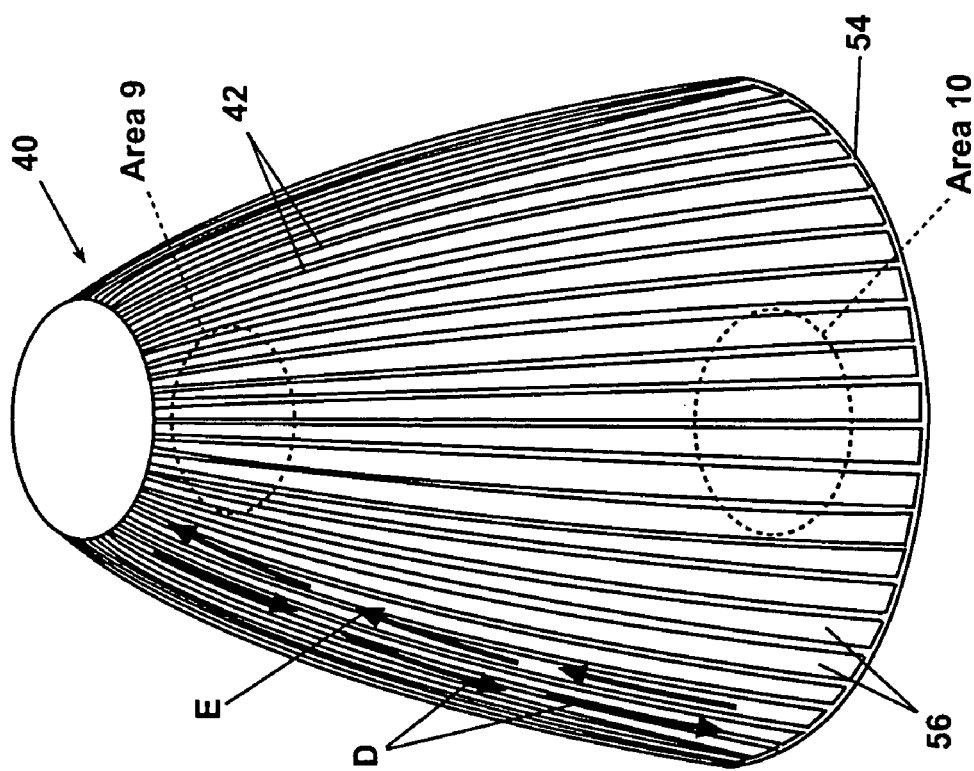
FIG. 8 is the perspective view of FIG. 5 further showing exemplary flow channel flow patterns for a two pass flow channel embodiment of the present invention.

Referring to FIG. 8, the conical nozzle 40 having the plurality of swaged L-channels 42 is shown in further detail. A plurality of tapered flow channels 56 are formed in the conical nozzle 40. A manifold 54 is also shown which will collect fluid at a lower portion of the conical nozzle 40 for redirection of the fluid. The manifold 54 is known in the art and will therefore not be discussed in further detail herein. A downward flow direction arrow D and an upward flow direction arrow E are shown to designate that adjacent tapered flow channels 56 provide fluid flow in opposite directions. Flow in each tapered flow channel 56 in the downward flow direction arrow D will collect in the manifold 54 for redirection in the uppward flow direction arrow E.

Figure 9:
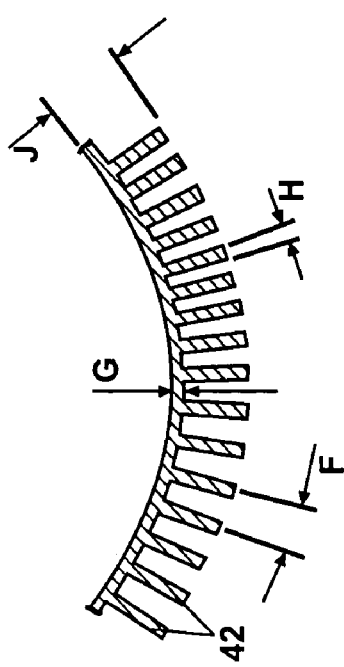
FIG. 9 is a partial top section view taken from area 9 of FIG. 8 showing narrow radial spacing between channel radial members at an upper or narrow cone end of a nozzle assembly of the present invention.

Referring to FIG. 9, the plurality of swaged L-channels 42 are shown having a narrow radial spacing F. A full linking member thickness G is indicated in this upper section of the conical nozzle 40 for the channel linking members of the swaged L-channels 42. Each of the swaged L-channels 42 has a radial member length J and a radial member thickness H.

Figure 10:
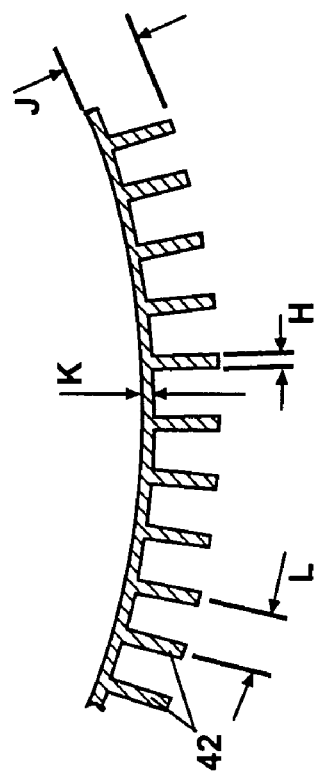
FIG. 10 is a partial top section view taken from area 10 of FIG. 8 showing wide radial spacing between channel radial members at a lower or wide conical end of a nozzle assembly of the present invention.

Referring to FIG. 10, in a lower area of the conical nozzle 40, each of the swaged L-channels 42 has a wide radial spacing L as shown. A reduced linking member thickness K results from forming the wide radial spacing L at this lower end of the conical nozzle 40 as more fully explained in reference to FIG. 11 herein. It should be noted that the radial member length J and the radial member thickness H are the same in this lower area as in the upper area of FIG. 9.

Figure 11:
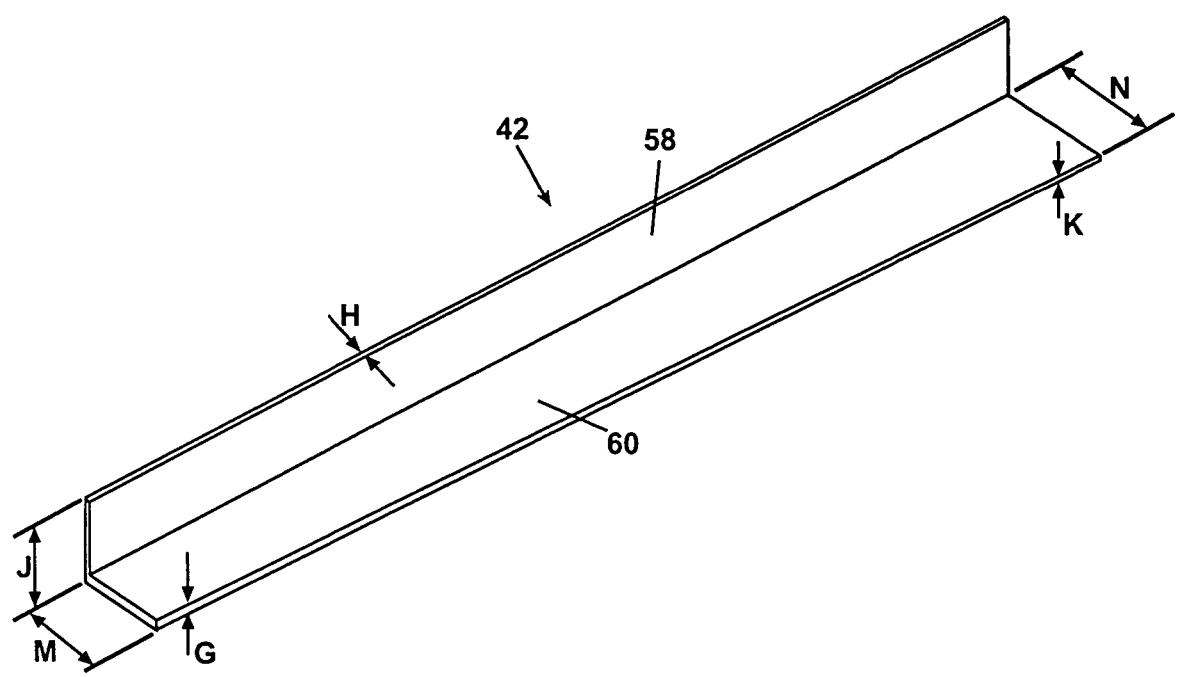
FIG. 11 is a perspective view of a single L-channel of the present invention showing a swaged channel linking member having a reduced wall thickness and wider flange on a distal end compared to its proximate end.

Referring now to FIG. 11, an exemplary swaged L-channel 42 is shown having a radial member 58 and a linking member 60. The radial member thickness H and the radial member length J are retained at both ends of the swaged L-channel 42. The full linking thickness G (shown in FIG. 9) results at the narrow linking width M proximate end. The swaging process results in the reduced linking member thickness K (shown in FIG. 10) and the wide linking member width N distal end of the swaged L-channel 42. It should be noted that the radial member thickness H of the radial member 58 is thinner than either the full linking member thickness G or the reduced linking member thickness K of the linking member 60. As previously discussed, this permits the radial member 58 of each swaged L-channel 42 to rupture prior to a failure of the linking member 60. Since the radial member 58 will rupture before either the linking member 60 or the conical jacket 46, fluid is retained within the tapered flow channel 56 (shown in FIG. 8).

Because of the increased stiffness from the structure of the L-shaped channels of the present invention, the number of L-shaped channels required to produce a nozzle assembly can be reduced from the quantity of tubes previously used for nozzles known in the art. In an exemplary embodiment, approximately 1,000 to approximately 1,100 tubes are required to produce a rocket nozzle having an upper diameter of approximately 76.2 cm (30 in) and a lower diameter of approximately 183 cm (6 ft). Using the L-shaped channels of the present invention, the number of L-shaped channels required for a similarly sized rocket nozzle is approximately 940.

In a preferred embodiment of the present invention, material for the L-shaped channels comprises one of the "superalloy" materials, including an iron-nickel-chromium based A-286 material or a JBK 75 material. In a preferred embodiment, the jacket material is one of a JBK 75 or a nickel-chromium-iron 718 material. Other metals, including other alloys of nickel-chromium-iron, can be substituted for the materials of the present invention. Lower strength/temperature range materials, including stainless steels known in the art, can be substituted if a nozzle is designed for single use. The preferred materials of the present invention are selected to provide a nozzle design which is capable of reuse requiring a multiple cycle life. In a preferred embodiment, quartered sections of the nozzle are preassembled and are joined together to form each of the nozzle assemblies. Sections may be more or less than the quarter sections indicated at the discretion of the assembler. Construction of each nozzle from a plurality of sections allows a damaged nozzle assembly to be repaired by doing individual work on separate flow channels or by replacing an entire segment. The use of segments also permits a stockpile of segments to be prepared in advance such that damage to a nozzle assembly under construction can be repaired using one of the segments.

Figure 12:
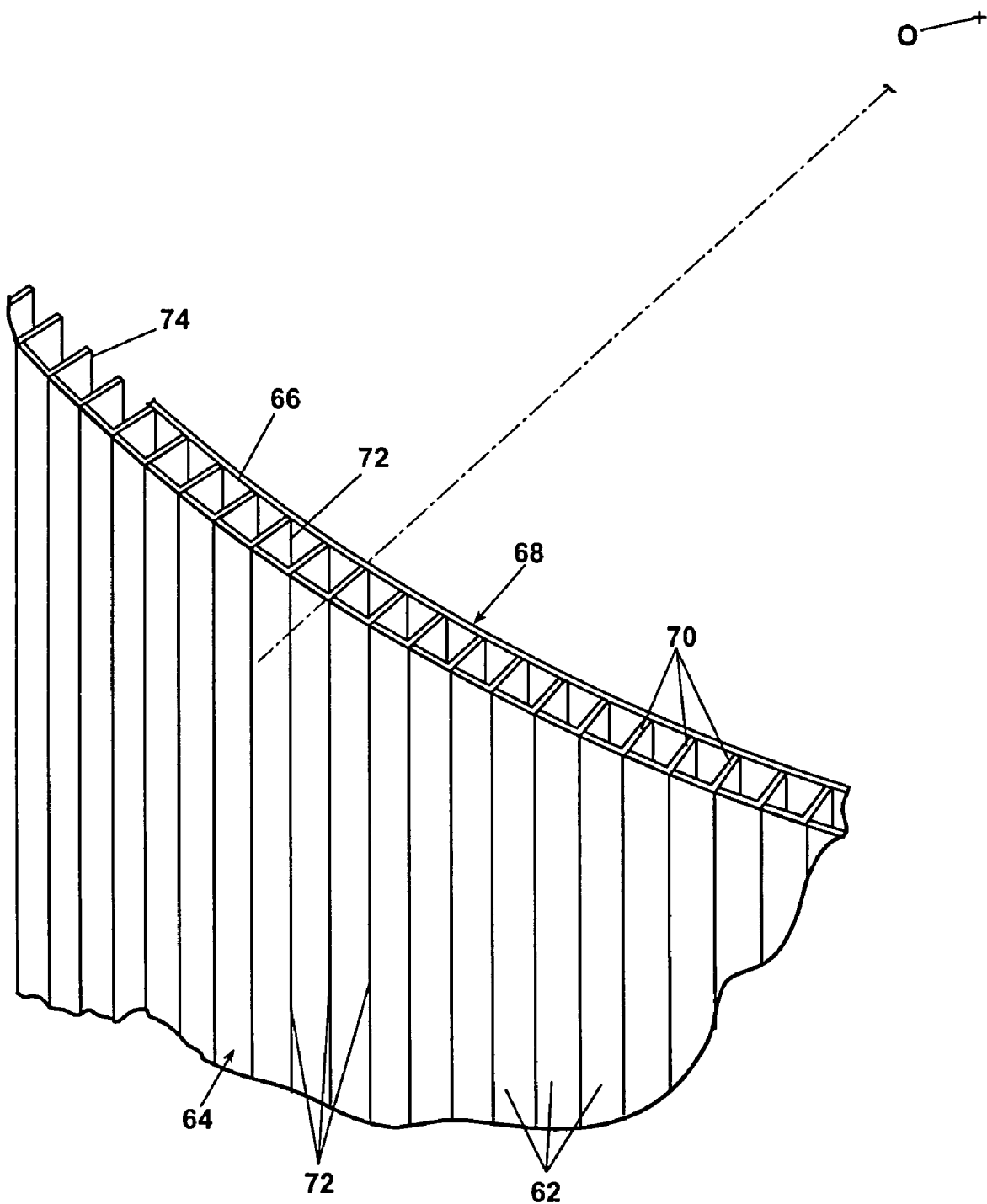
FIG. 12 is a partial perspective view of a preferred embodiment of the present invention, having an inverted arrangement of the linking members and jacket.

Referring to FIG. 12, an inverted arrangement of L-shaped channels is shown. A plurality of channel linking members 62 form a nozzle outer surface 64, and a jacket 66 (similar to the jacket 16) forms a nozzle inner surface 68. Each of a plurality of channel radial members 70 extend radially inward from the nozzle inner surface 68 toward a central axis point O defining the nozzle geometric shape. A preformed tool (not shown) is constructed to constrain the arrangement of channel radial members 70 relative to the jacket 66 of this embodiment. Each of a plurality of longitudinal welds 72 is used to join the jacket 66 to a distal end 74 of each of the channel radial members 70. Access to weld the plurality of channel linking members 62 is therefore available on the nozzle outer surface 64.

The L-shaped channel and jacket assembly of the present invention can also be used as a heat exchanger jacket around the perimeter of items requiring heat transfer. A cooling fluid can be circulated through the flow channels of the present invention in either a single pass or a double pass configuration. Nozzles assembled using the L-shaped channel and jacket of the present assembly can also be used in other applications including jet nozzles.

The nozzle assembly of the present invention offers several advantages. The welded L-shaped channels of the present invention replace the brazed tubes known in the art. The tubes known in the art require a coating of nickel material to allow them to be brazed to each other. The coating step is also eliminated by the present invention. By designing each of the channel radial members with a reduced wall thickness, an over-pressure condition in one of the flow chambers results in a failure of the local channel radial member and contains leakage within the adjacent L-shaped channels of the nozzle assembly. By assembling a plurality of L-shaped channels using segments, an entire segment can optionally be replaced rather than attempting to individually repair a damaged section.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for forming a flow nozzle having a plurality of fluid-tight adjacent chambers, using a plurality of L-shaped channels each having a linking member and a radial member, the method comprising:

welding each linking member to an adjacent L-shaped channel, operatively forming a linking member contiguous surface;

orienting each radial member substantially perpendicular to a first side of the contiguous surface;

forming a second side of the contiguous surface into a flow nozzle wall;

shaping a jacket operable to contact each of the radial members when the jacket is oriented substantially parallel to the contiguous surface and separated from the contiguous surface by each of the radial members; and welding the jacket to each radial member to operably form the plurality of fluid-tight adjacent chambers bounded between adjacent ones of the radial members, the jacket, and the contiguous surface.

2. The method of claim 1, comprising swaging a distal end of each linking member to operably increase a width and decrease a thickness of the distal end compared to a width and a thickness of a proximate end of each of the linking members.

3. The method of claim 2, comprising aligning the linking members having the distal end of each linking member abutting the distal end of an adjacent linking member.

4. The method of claim 3, comprising shaping the flow nozzle wall into a cone shape.

5. The method of claim 3, comprising arranging adjacent ones of the radial members having a first spacing in a first area of the flow nozzle and a second spacing in a second area of the flow nozzle.

6. The method of claim 1, comprising:

butting together opposed ends of the contiguous surface to to operably form a seam of the flow nozzle wall; and welding the seam.

7. The method of claim 1, comprising forming a flow manifold operable to join adjacent ones of the fluid-tight adjacent chambers.

8. A method for forming a flow nozzle having a plurality of L-shaped channels each having a linking member oriented substantially perpendicular to a radial member, the method comprising:

abutting a distal end of each linking member to an adjacent L-shaped member such that the radial members of the plurality of L-shaped channels each face away from a common center of curvature;

welding the distal end of each linking member to the adjacent L-shaped member;

shaping a resultant contiguous surface of welded linking members into a radius about the center of curvature; and performing a plurality of laser welds operably joining a jacket to a distal end of each radial member wherein each laser weld operably penetrates through the jacket to the distal end of each radial member defining a plurality of fluid-tight chambers each bounded between proximate ones of the radial members, the jacket, and each linking member.

9. The method of claim 8, comprising shaping the contiguous surface as a cylinder.

10. The method of claim 8, comprising shaping the contiguous surface as one of a circle, an oval, a cone, an ellipsoid, a paraboloid and a hyperboloid.

11. The method of claim 8, comprising forming the flow nozzle in a plurality of sections having an opposed pair of edge seams.

12. The method of claim 11, comprising welding preselected quantities of the sections at each edge seam to operably form the nozzle.

13. The method of claim 12, comprising:
cutting off a damaged one of the sections along selected ones of the edge seams; and
replacing the damaged section with one of the plurality of sections.

14. The method of claim 8, comprising reducing a radial member thickness below a linking member thickness for each L-shaped channel.

15. The method of claim 8, comprising forming the nozzle from at least one of a plurality of superalloy materials.

16. A method for forming a rocket nozzle having a main flow chamber surrounded by a plurality of fluid-tight chambers, using a plurality of angular channels each having a first member and a second member oriented substantially perpendicular to the first member and a jacket, the method comprising:
welding each first member to an adjacent one of the angular channels, each angular channel defining an L-shape, operatively forming a contiguous surface of the first members wherein each second member is positioned on a first side of the contiguous surface;
aligning the jacket substantially parallel to the first side of the contiguous surface;
shaping one of a second side of the contiguous surface and the jacket about a radius of curvature to operably form an innermost surface of the main flow chamber; and
creating a weld joint between the jacket and each of the second members operably forming the plurality of fluid-tight chambers each bounded between adjacent ones of the second members, the jacket, and the contiguous surface.

17. The method of claim 16, wherein the shaping step comprises cylindrically forming the main flow chamber.

18. The method of claim 16, wherein the shaping step comprises conically forming the main flow chamber.

19. A method for forming a nozzle having interspaced fluid chambers, comprising:
creating a plurality of generally L-shaped channels each having a linking member and a radial member configured substantially perpendicular to said linking member;
arranging said plurality of channels having said linking members abutting each other and oriented substantially perpendicular to a center of curvature, the radial members all extending radially away from said center of curvature;
weld-joining a butted end of each of said linking members to a proximate one of said linking members to operably form a contiguous curved surface of linking members;

positioning a jacket in contact with all of said radial members, said jacket substantially parallel with said contiguous curved surface and separated from said contiguous curved surface by said radial members;
welding opposing ends of said jacket to define at least one jacket edge seam, said jacket edge seam longitudinally co-aligned with proximate ones of said radial members; and
connecting said jacket to each radial member using a laser weld joint created through the jacket to a distal end of each radial member to operatively form a plurality of fluid-tight chambers each bounded between proximate ones of said radial members, said jacket, and said contiguous surface.

20. The method of claim 19, comprising swaging each said L-shaped channel such that a distal end of each linking member has both an increased width and a decreased thickness compared to a width and a thickness of an opposite end of each of said plurality of L-shaped channels.

21. The method of claim 20, comprising forming a tool having a desired geometric shape for said nozzle.

22. The method of claim 21, comprising:
selectively placing each of said plurality of L-shaped channels in said tool forming adjacent pairs of channels; and
supporting said L-shaped channels for at least one welding procedure to join each of said adjacent pairs of channels in said tool.

23. The method of claim 22, comprising welding each of said adjacent pairs of said channels using a laser welding process.

24. The method of claim 23, comprising constructing said nozzle in approximately equal sized segments.

25. The method of claim 24, comprising joining said equal sized segments at an edge seam of each said segment.

26. The method of claim 23, comprising locating each said radial member of each said L-shaped channel through a thickness of said jacket using one of an X-ray technique and an ultrasonic technique prior to welding each of said adjacent pairs of said channels using said laser welding process.

27. The method of claim 23, comprising adding a filler material during said laser welding process.

28. The method of claim 19, further comprising shaping said contiguous surface into a circumferentially enclosed chamber oppositely positioned from said radial members side about said contiguous surface.

29. The method of claim 19, further comprising:
swaging each of said linking members from a first end to a second end to operably increase a width and decrease a thickness of the second end compared to a width and a thickness of the first end; and
abutting all of the second ends of said linking members to each other during the arranging step.

30. The method of claim 19, further comprising shaping said jacket into a cone shape divisible into quarter sections together operable to completely enclose said radial members.

* * * * *